Aug. 18, 1936. H. S. BUSEY Re. 20,067

WIRE DRAWING APPARATUS

Original Filed Sept. 13, 1928 2 Sheets-Sheet 1

Inventor
Hubert S. Busey
By Pennington and White
Attorneys

Aug. 18, 1936. H. S. BUSEY Re. 20,067

WIRE DRAWING APPARATUS

Original Filed Sept. 13, 1928 2 Sheets-Sheet 2

Inventor
Herbert S. Busey
By Pennington and White
Attorneys

Reissued Aug. 18, 1936 Re. 20,067

UNITED STATES PATENT OFFICE 20,067

WIRE DRAWING APPARATUS

Herbert S. Busey, Providence, R. I., assignor to Kennecott Wire and Cable Company, Phillipsdale, R. I., a corporation of Rhode Island Original No. 1,835,462, dated December 8, 1931, Serial No. 305,794, September 13, 1928. Application for reissue December 8, 1933, Serial No. 701,470

12 Claims. (Cl. 205—25)

This invention relates to wire-drawing apparatus, and particularly to an improved die-holder for mounting the die through which the wire is drawn, and means combined therewith for cooling, lubricating and cleaning the die during the drawing operation.

One object of the invention is to provide a die-holder for interchangeably mounting various types of dies adapted for drawing wire or the like to different sizes.

Another object of the invention is to provide means for circulating a cooling fluid such as lubricant around the die to prevent it from overheating during the drawing process.

Another object of the invention is to provide means for feeding the lubricant to the entrance or mouth of the die in such manner as to set up a rotary motion or whirling action thereof, whereby to clean the die and the wire passing therethrough to prevent the accumulation of dirt, scale of foreign particles thereon.

Further objects of the improvements are set forth in the following specification which describes a preferred form of construction of the invention, by way of example only, as illustrated by the accompanying drawings.

Figure 1:
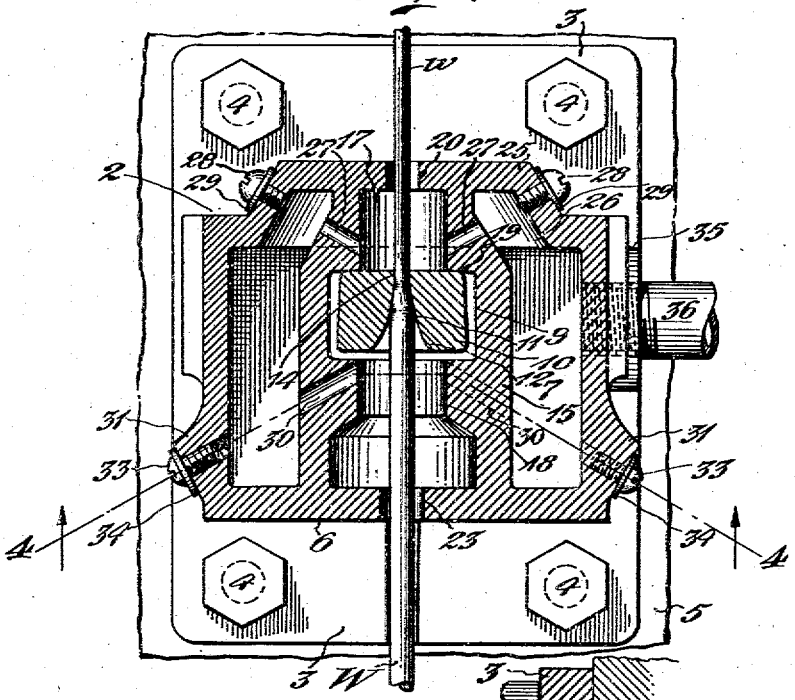
Fig. 1 is a front sectional view of the improved die-holder and die, taken on the vertical axis of the die and illustrating the wire as being drawn therethrough.

In the art of drawing wire by reducing the stock to smaller size the drawing machine is provided with a plurality of die-holders in which dies of different types may be interchangeably mounted, the dies having orifices of different sizes in accordance with the size or diameter of the wire to be produced. The wire-drawing machine or apparatus is not herein shown or described in detail as it may be of any usual construction provided with means for feeding the stock through the dies and coiling or reeling the finished product.

The die-holders are usually bolted or otherwise suitably attached to the side of the machine, and in the preferred embodiment of the invention as herein shown the holder 2 is constructed in the form of a hollow casing or box having lateral flanges 3 for receiving the bolts 4 which screw into the machine frame 5. The casing 6 of the holder 2 may be of substantially cubicle shape provided with an inner chamber 7 for the lubricant and cooling fluid.

Disposed centrally of the casing 7 adjacent the front thereof is the die-receiving recess of socket 9 for holding the die 10 which is usually constructed in the form of a frusto-conical disk of hardened steel. The die 10 is pierced with an axial bore or orifice 11 through which the wire is drawn, the bore 11 being enlarged at its mouth or entrance 12 to several times the diameter of the stock to be operated upon and tapered inwardly toward the top to terminate in a contracted delivery opening 14 accurately sized to the diameter of the wire to be produced. The entrance 12 of the bore or orifice 11 has flaring walls which provide a bell-shaped cavity adapted to receive and retain an amount of lubricant which is caused to swirl around therein with a rotary motion to flush the opening in the manner and for the purpose as later more fully explained.

Surrounding the die-recess 9 is a semi-cylindrical boss or hub 15 which is provided with axial bores or chambers 17 and 18 disposed in axial alinement with the die 10 at the top and bottom thereof. The upper bore 17 is of less diameter than the die-opening 9 whereby to form shoulders 19 against which the die 10 seats and is held under the lineal thrust of the wire stock W as it is drawn through the die. A slot or opening 20 is provided in the closed top of the casing 6, see Fig. 5, for the passage of the reduced portion W of the wire as it draws through the die. Preferably, the sides of the slot 20 are extended at the front of the die-holder 2 by forming the hub 15 with projections or jaws 21 having opposite divergent faces which provide a reentrant tapered mouth leading into the slot 20.

The lower portion of the hub 15 is constructed in substantially the same manner with the cylindrical chamber 18, before referred to, leading into the die-socket 9. The lower portion of the chamber 18 may be cored out to a larger diameter, as shown at 22 in Figs. 1 and 2, and opening through its front wall is an entrance slot 23 for the wire stock W. The sides of the slot 23, like those of the upper slot 20, are extended in divergently faced jaws 24 shown in Fig. 2. This form of construction provides that the wire may first be inserted through the bore or orifice 11 in the die 10 and the die then placed in the recess 9 of the holder 2 with the wire guided into position by the reentrant openings to the slots 20 and 23.

The top of the casing 6 is extended upwardly in the form of a mushroom-shaped boss 25 having beveled sides joined to the top of the die-holder 2 and providing an inner sloping-walled chamber 26 surmounting the main fluid chamber 7. Leading from the chamber 26 down into the central chamber or bore 17 are inclined ducts 27 for feeding the cooling fluid to the top of the die 10 around the delivering end of the orifice 11 where the greatest heat is generated during the drawing operation. The ducts 27 are conveniently formed by drilling radial holes through the walls of the casing 6 at diametrically opposite points on the rim of the boss 25, the beveled face of which provides for spotting the drill. After the ducts 27 have been drilled in this manner the holes in the rim of the boss 25 are tapped to receive screws 26 which are inserted therein with packing-washers or gaskets 29 under their heads to seal the outer wall of the casing against the escape of the lubricant.

Figure 2:
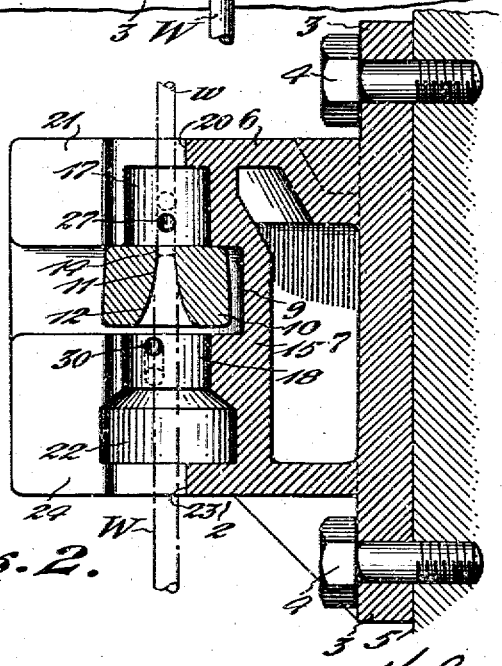
Fig. 2 is a sectional side view of the die-holder and die taken on the vertical axis and illustrating the position of the wire in dot-and-dash lines.
Figure 3:
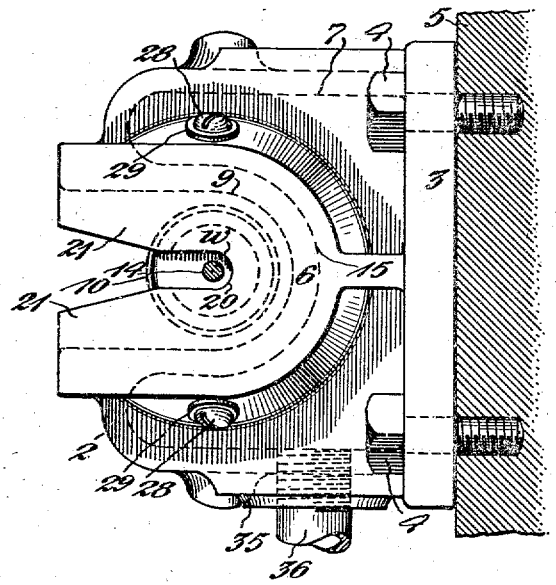
Fig. 3 is a plan view of the die-holder, showing the wire in transverse section.
Figure 4:
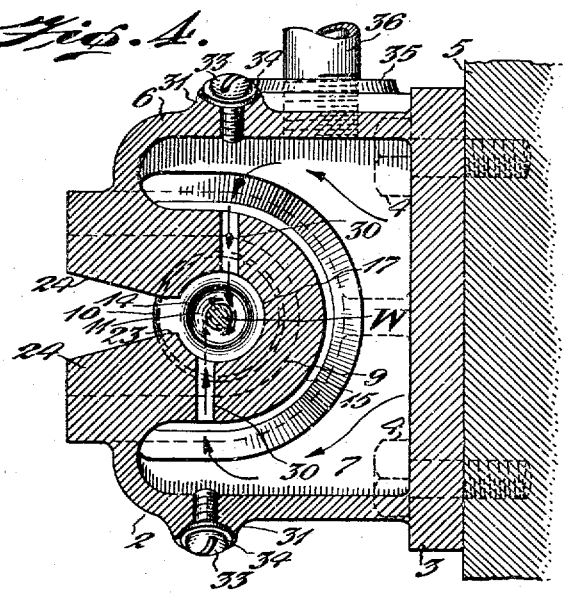
Fig. 4 is an inverted plan view of the die-holder, showing it in section on line 4—4 of Fig. 1, as viewed in the direction of the arrows.

The means for lubricating the die at the entrance to its bore or orifice 11 constitute an important feature of improvement and comprises a novel arrangement of feed ducts as next described. Drilled through the walls of the hub 9 and entering into the upper part of the central bore or chamber 18 are inclined ducts 30 which are disposed in offset relation with respect to the axis of the bore 11 in the die 10. As shown most clearly in Fig. 4, the ducts 30 are arranged with their axes substantially tangential to the bore 11 in the die 10 and inclined upwardly toward the mouth of the bore. The ducts 30 are drilled through from the outside of the casing 6, bosses 31 being preferably provided on the sides thereof as shown in Figs. 1 and 4, with their faces inclined at the proper angle to center the drill during the drilling operation. The holes in the outer walls of the casing 6 are tapped to receive plugs or screws 33 having washers 34 under their heads for sealing the openings in the manner as previously explained.

Tapped through a boss 35 on one side of the casing 6 of the die-holder 2 is a feed-pipe 36 through which the lubricant is introduced into the main chamber 7 under pressure. The pipe 36 may lead from a suitable reservoir for the lubricant which is connected to a force pump or compressor, not herein shown, for forcing the fluid into the chamber 7 and maintaining it under pressure to cause it to feed therefrom through the ducts 27 and 30 in the manner and for the purpose as later explained.

The method of operation of the complete apparatus is as follows: the end of the wire stock to be drawn is reduced to a size to allow it to be passed through the orifice 11 in the die 10, it being understood that a die of the required size is selected in accordance with the diameter of the wire to be produced. After the wire has been passed through the die 10 in the manner as above explained the die is inserted in the cavity or socket 9 with the wire entered into the slots 20 and 23 through their flaring openings. The leading end of the wire is attached to the means which draws it through the die and the machine is then ready to operate.

During the operation of the machine the pressure means are actuated to force the fluid through the feed-pipe 36 into the chamber 7 of the casing 6, a suitable lubricant such as soapy solution being used for both cooling the die and lubricating the wire orifice 11. The lubricant is thus caused to fill the chamber 7 and to flow therefrom under pressure through the two sets of ducts 27 and 30. The fluid flowing through the upper ducts 27 is directed down onto the top of the die around the delivery opening 14, accumulating in the pocket or chamber 17 where it acts to cool the die; it being understood that considerable heat is generated from friction as the stock is reduced in size at the contracted end of the bore in the die.

The purpose of injecting the fluid at the opposite or receiving end of the die 10 is more particularly to lubricate the wire and the orifice 11, and in accordance with the present improvement this is accomplished in a novel and ingenious manner whereby to flush out the mouth of the bore to remove the dirt, scale and other foreign matter which is scraped off from the stock.

The lubricating fluid is forced upwardly through the inclined ducts 30 and injected into the flaring mouth 12 of the orifice 11 at a tangent to the surface of the wire-stock W feeding therethrough; it having been explained that these ducts are directed in planes offset from the axis of the bore in the die. As the lubricant is directed into the mouth of the orifice 11 in this manner a rotary motion or whirling action of the fluid takes place as indicated graphically by the arrows in Fig. 4. The lubricant swirls around the wire with a rapid motion and is thrown radially outward under centrifugal force against the walls of the tapered opening 12, whence it drips back into the chamber 18. A portion of the fluid is carried into the restricted end of the bore 11 to lubricate its contact with the wire drawing therethrough, but the greater part is whirled around and ejected from the mouth of the bore to flush out the particles of dirt, scale and other matter scraped off from the stock. In this manner the entrance of the bore in the die is kept clean and bright to prevent the accumulation of any foreign matter which might work into the orifice and tend to abrade or rough up the surface of the wire.

It has been demonstrated that a drawing machine equipped with the present improved die-holder can be operated continuously over long periods without requiring periodical cleaning of the dies; and furthermore and most important, the wire produced therein is superior in the quality of its surface finish. That is to say, the finished wire will not be roughed up, scratched on its surface or scarred, but will present a uniformly smooth finish and bright polish.

My improved die-holder and lubricating device therefore provides for more economical operation of the wire-drawing machine and produces a more uniform and finished product. The device is simple in construction, economical to manufacture and proof against breakage or getting out of order.

While I have herein described and illustrated the device as embodied in a preferred form of construction it is to be understood that various modifications may be made in the form and arrangement of its parts without departing from the spirit or scope of the invention. Therefore, without limiting myself in this respect, I claim:

1. In a wire-drawing apparatus, the combination of a die having an orifice through which the wire feeds, said orifice formed with a flaring mouth at its end, and a jet for injecting fluid into the mouth of the orifice, said jet having its longitudinal axis disposed at an inclination to the longitudinal axis of the orifice and in a plane parallel therewith, whereby said fluid is caused to enter the mouth tangentially of its walls to swirl around therein in a vortex to flush out dirt, scale or other foreign matter therefrom.

2. In a wire-drawing apparatus, the combination of a die having a tapering orifice through which the wire draws, said orifice continued in a flaring bell-shaped mouth at one end, a duct extending toward the orifice with its longitudinal axis disposed at an inclination to the longitudinal axis of the orifice and in a plane parallel therewith, whereby to direct it tangentially of the walls of the flaring mouth, and means for forcing fluid through the duct under pressure to cause it to circulate in the mouth of the orifice with a vortex motion to flush out the entrance to the die to remove dirt, scale and other foreign matter therefrom.

3. In a wire-drawing apparatus, the combination of a die having an orifice through which the wire draws, said orifice formed with a flaring mouth at its end of considerably greater diameter than the wire, a die-holder having means for mounting the die and provided with a duct having its longitudinal axis disposed at an inclination to the longitudinal axis of the die orifice and in a plane parallel therewith, whereby to direct it tangentially of the walls of the mouth of the orifice, and means for forcing fluid through the duct under pressure to cause it to swirl around in the mouth of the orifice in the die to flush dirt, scale and other foreign matter therefrom.

4. The combination of a die-holder provided with an interior closed chamber and a recessed seat on its side, an apertured die held in the recessed seat of the holder, said die formed with a restricted orifice continued at one end in a flaring mouth, ducts leading from the interior chamber of the die-holder toward the mouth of the die with the axis of each duct disposed at an inclination to the longitudinal axis of the die orifice and in a plane parallel therewith, whereby the ducts are directed tangentially of the walls of the mouth of the die, and means for supplying fluid under pressure to the interior chamber of the die-holder to cause it to flow through the ducts into the mouth of the die in such direction as to effect a vortex action therein to flush out particles of dirt, scale and foreign matter therefrom.

5. The combination of a die holder having a recessed seat on its side for receiving a die, a passageway extending across the seat with walled compartments at either side thereof, said holder also provided with an interior chamber surrounding the seat for containing a cooling fluid, a die adapted to be held in the seat in the holder, said die provided with a restricted opening through which the wire draws and said opening having an outwardly flaring mouth, ducts leading from the fluid chamber of the holder into the walled compartments in a direction inclined to and offset at one side of the wire drawing through the die and debouching adjacent the mouth of the die, and means for supplying fluid under pressure to the interior chamber to cause it to flow through the ducts and into the mouth of the die tangentially of its walls to set up a vortex action therein to flush particles of dirt, scale and other foreign matter therefrom.

6. In a wire drawing apparatus, a die holder having a die recess, a die in said recess having an orifice through which the wire is drawn, said die holder having a plurality of ducts adjacent the mouth of the die and positioned on the same side thereof transversely of the longitudinal axis of the die orifice, said ducts being in substantially diametric opposed relation to the die orifice, and means for supplying said ducts with fluid under pressure.

7. In a wire drawing apparatus, a die holder having a die recess, a die in said recess having an orifice through which the wire is drawn, said die holder having a plurality of ducts adjacent the mouth of the die and positioned transversely of the longitudinal axis of the die orifice, said ducts being on opposite sides of the die entrance and out of line with said axis, and means for supplying said ducts with fluid under pressure.

8. In a wire drawing apparatus, a die holder having a die recess, a die in said recess having an orifice through which the wire is drawn, said die holder having a plurality of ducts adjacent the mouth of the die and positioned transversely of the longitudinal axis of the die orifice, said ducts being on opposite sides of the die entrance, and means for supplying said ducts with fluid under pressure, said ducts being inclined to said axis, in the direction of movement of the wire therethrough.

9. In a wire drawing apparatus, a die holder having a die recess, a die in said recess having an orifice through which the wire is drawn, said die holder having a plurality of ducts adjacent the mouth of the die and positioned transversely of the longitudinal axis of the die orifice, said ducts being on opposite sides of the die entrance and out of line with said axis, and means for supplying said ducts with fluid under pressure, said ducts being inclined to said axis, in the direction of movement of the wire therethrough.

10. In a wire drawing apparatus, a die holder having a wire inlet chamber, a die recess, and a wire outlet chamber, a die in said recess having an orifice through which the wire is drawn, the walls of said inlet chamber having an inlet duct adjacent the mouth of the die and positioned transversely of the longitudinal axis of the die orifice, said inlet duct being out of line with said axis, and means for supplying said inlet duct with fluid under pressure.

11. In a wire drawing apparatus, a die holder having a wire inlet chamber, a die recess, and a wire outlet chamber, a die in said recess having an orifice through which the wire is drawn, the walls of said inlet chamber having an inlet duct adjacent the mouth of the die and positioned transversely of the longitudinal axis of the die orifice, said inlet duct being out of line with said axis and inclined to said axis in the direction of movement of the wire therethrough.

12. In a wire drawing apparatus, a die holder having a wire inlet chamber, a die recess, and a wire outlet chamber, said recess having a seat, a die adapted to contact said seat and having an orifice through which the wire is drawn, the walls of said inlet and outlet chambers having sets of fluid inlet ducts respectively adjacent the mouth and the outlet end of said die, and means for supplying said ducts with fluid under pressure.

HERBERT S. BUSEY.